United States Patent
Narasimha et al.

(10) Patent No.: US 9,357,563 B2
(45) Date of Patent: May 31, 2016

(54) PREVENTING MISUSE OF RANDOM ACCESS PROCEDURE IN WIRELESS COMMUNICATION SYSTEM

(75) Inventors: Murali Narasimha, Lake Zurich, IL (US); Ravi Kuchibhotla, Gurnee, IL (US); Padmaja Putcha, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 472 days.

(21) Appl. No.: 12/511,882

(22) Filed: Jul. 29, 2009

(65) Prior Publication Data

US 2010/0039988 A1 Feb. 18, 2010

Related U.S. Application Data

(60) Provisional application No. 61/088,230, filed on Aug. 12, 2008.

(51) Int. Cl.
| | |
|---|---|
| *H04M 1/66* | (2006.01) |
| *H04M 1/68* | (2006.01) |
| *H04M 3/16* | (2006.01) |
| *H04W 74/00* | (2009.01) |
| *H04W 12/08* | (2009.01) |
| *H04W 74/08* | (2009.01) |

(52) U.S. Cl.
CPC .......... *H04W 74/008* (2013.01); *H04W 12/08* (2013.01); *H04W 74/0833* (2013.01)

(58) Field of Classification Search
CPC .................. H04W 74/0833; H04W 56/0045; H04W 72/0406; H04W 72/042; H04W 56/0005; H04W 56/001; H04W 72/0413; H04W 72/0446; H04W 56/00; H04W 74/008; H04W 12/08; H04L 5/0053
See application file for complete search history.

(56) References Cited

U.S. PATENT DOCUMENTS

| | | | |
|---|---|---|---|
| 6,956,948 | B1 | 10/2005 | Hwang et al. |
| 7,613,244 | B2 | 11/2009 | Hwang et al. |
| 2003/0171120 | A1 | 9/2003 | Mustapha |
| 2004/0214590 | A1 | 10/2004 | Al-Housami et al. |
| 2004/0260950 | A1 | 12/2004 | Ougi et al. |
| 2006/0194578 | A1 | 8/2006 | Zhang |

(Continued)

FOREIGN PATENT DOCUMENTS

| | | |
|---|---|---|
| CN | 1244247 C | 3/2006 |
| WO | 99/60729 A1 | 11/1999 |

(Continued)

OTHER PUBLICATIONS

Patent Cooperation Treaty, "PCT Search Report and Written Opinion of the International Searching Authority" for International Application No. PCT/US2010/040138 Feb. 9, 2011, 11 pages.

(Continued)

*Primary Examiner* — Ajit Patel
(74) *Attorney, Agent, or Firm* — Faegre Baker Daniels LLP

(57) ABSTRACT

A mobile station, base station and methods therein for preventing misuse of a random access procedure in a wireless communication network are disclosed. A mobile station transmits a random access preamble, receives a random access response message addressed to an identifier that has a one-to-one association with the random access preamble transmitted by the mobile station, and decodes the random access response message.

19 Claims, 4 Drawing Sheets

(56) References Cited

U.S. PATENT DOCUMENTS

| | | | |
|---|---|---|---|
| 2007/0206531 | A1 | 9/2007 | Pajukoski et al. |
| 2007/0206546 | A1 | 9/2007 | Albert, Jr. et al. |
| 2008/0080432 | A1 | 4/2008 | Lu et al. |
| 2008/0125043 | A1 | 5/2008 | Karmanenko et al. |
| 2008/0279294 | A1 | 11/2008 | Yang et al. |
| 2008/0310396 | A1 | 12/2008 | Park et al. |
| 2009/0238366 | A1 | 9/2009 | Park et al. |
| 2010/0041370 | A1 | 2/2010 | Narasimha et al. |
| 2010/0067498 | A1* | 3/2010 | Lee et al. ............ 370/336 |
| 2010/0093386 | A1* | 4/2010 | Damnjanovic et al. ....... 455/522 |
| 2010/0189071 | A1* | 7/2010 | Kitazoe ............ 370/331 |
| 2010/0254340 | A1* | 10/2010 | Park et al. ............ 370/329 |
| 2010/0260140 | A1* | 10/2010 | Zhu ............ 370/331 |
| 2010/0309877 | A1* | 12/2010 | Damnjanovic et al. ....... 370/331 |
| 2010/0331003 | A1* | 12/2010 | Park et al. ............ 455/450 |
| 2011/0096748 | A1* | 4/2011 | Meyer et al. ............ 370/329 |
| 2011/0170503 | A1* | 7/2011 | Chun et al. ............ 370/329 |

FOREIGN PATENT DOCUMENTS

| | | |
|---|---|---|
| WO | 2007073040 A1 | 6/2007 |
| WO | 2007077250 A2 | 7/2007 |
| WO | 2008023932 A1 | 2/2008 |
| WO | 2009042885 A2 | 4/2009 |

OTHER PUBLICATIONS

3GPP TS 36.321 V8.6.0 (Jun. 2009), "3rd Generation Partnership Project; Technical Specification Group Radio Access Network; Evolved Universal Terrestrial Radio Access (E-UTRA); Medium Access Control (MAC) protocol specification (Release 8)" pp. 1-47.

Bocan, Valer and Cretu, Vladimir, "Mitigating Denial of Service Threats in GSM Networks" Proceeding of the First International Conference on ARES 2006, Piscataway, NJ, Apr. 20, 2006, 6 pages.

Patent Cooperation Treaty, "PCT Search Report and Written Opinion of the International Searching Authority" for International Application No. PCT/US2009/053388 Feb. 16, 2010, 14 pages.

3GPP TSG-RAN WG1 #18, TSGR1#18(01)0123 "FPACH structure and coding for 1.28 Mcps TDD" LG Electronics Inc., Boston USA, Jan. 15-18, 2001, 6 pages.

3GPP TS36.321 v8.5.0 (Mar. 2009), 3rd Generation Partnership Project; Technical Specification Group Radio Access Network; Evolved Universal Terrestrial Radio Access (E-UTRA) Medium Access Control (MAC) protocol specification (Release 8), Section 5.1.2.

US Office Action, U.S. Appl. No. 12/511,873, mailed Nov. 14, 2011.

United States Patent and Trademark Office, "Non-Final Rejection" for U.S. Appl. No. 12/511,873 dated May 1, 2012, 25 pages.

Korean Intellectual Property Office, "Notice of Preliminary Rejection" for Korean Patent Application No. 10-2012-7002348 dated Aug. 29, 2013, 8 pages.

The State Intellectual Property Office of the People's Republic of China, "Notification of the First Office Action" for Chinese Patent Application No. 201080032938 dated Dec. 4, 2013, 13 pages.

Federal Service for Intellectual Property (Rospatent), "Official Action" for Russian Patent Application No. 2011109795/07(013381) dated Mar. 16, 2012, 3 pages.

United States Patent and Trademark Office, Decision on Appeal for U.S. Appl. No. 12/511,873 (related to above-captioned patent application), mailed Nov. 27, 2015.

* cited by examiner

PREVENTING MISUSE OF RANDOM ACCESS PROCEDURE IN WIRELESS COMMUNICATION SYSTEM

FIELD OF THE DISCLOSURE

The present disclosure relates generally to wireless communications and more particularly to preventing misuse of the random access procedure by malicious user terminals in wireless communication systems.

BACKGROUND

In 3GPP LTE, the Random Access Channel (RACH) procedure consists of a User Equipment (UE) sending a random access (RA) preamble to the eNB in a RACH occasion and receiving a random access response from the eNB. The RA response includes the RACH preamble used, a temporary Cell-Radio Network Temporary Identifier (C-RNTI) assignment, and an uplink (UL) resource assignment. The UE transmits "message 3" on the resource assigned in the RA response. The RA response is addressed, on the Physical Downlink Control Channel (PDCCH) to the Random Access Radio Network Temporary Identifier (RA-RNTI) corresponding to the RACH occasion that was used by the UE to transmit the RA preamble. In the contention based RACH procedure, message 3 can be a Radio Resource Control (RRC) Connection establishment request or a RRC Connection Re-establishment request. Below we show that the RACH procedure has a loophole that a malicious UE can exploit to deny service to other UEs.

The LTE random access procedure according to 3GPP TS 36.321 is illustrated in FIG. 1. In the contention based RA procedure, the UE selects a RA preamble identifier, to transmit to the network, from a set of RA preamble identifiers supported by the eNB. The UE also selects a RA time-frequency resource (physical random access channel) to transmit the RA preamble from a set of available RA time-frequency resources. The UE then transmits the selected RA preamble identifier using the selected RA time-frequency resource (MSG 1). The UE then receives a RA response message (MSG 2), which includes a temporary C-RNTI and an uplink resource assignment (UL grant). The UE then transmits message 3 which includes a unique identifier of the UE. Examples of message 3 include RRC connection establishment request and RRC connection re-establishment request. It is possible that contention occurs during message 3 transmission, i.e., another UE (e.g., UE2) transmitting its message 3 using the UL grant provided in MSG 2 due to UE2 having transmitted the same RA preamble identifier in the same RA time-frequency resource as the UE. If the eNB is able to resolve the contention in favor of the UE, it transmits a message 4 to the UE indicating successful resolution of contention. The RACH procedure is then considered complete.

In the non-contention based RA procedure, the eNB transmits a message (MSG 0) indicating an assigned RA preamble identifier. The UE then selects a RA time-frequency resource (physical random access channel) to transmit the RA preamble, from a set of available RA time-frequency resources. The UE then transmits the assigned RA preamble identifier using the selected RA time-frequency resource (MSG 1). The UE then receives a RA response message (MSG 2), which includes a temporary C-RNTI and an uplink resource assignment (UL grant). The RACH procedure is then considered complete.

Prior art FIG. 2 illustrates a known procedure for exploiting a RACH loophole. The malicious UE can simply listen for RA responses (by searching for valid RA-RNTIs on the PDCCH) and acquire the UL grants. It can then use the resource assigned in the UL grant to send a fake message 3. For example, the malicious UE sends an RRC Connection Re-establishment request as message 3 including in it a randomly chosen Message Authentication Code-I (MAC-I), any C-RNTI and Physical Cell Identifier (PCI). The eNB cannot identify the UE requesting the re-establishment; therefore it rejects the RRC connection establishment. The legitimate UE may have started the RACH procedure for an RRC connection re-establishment or an RRC connection establishment. In both cases the legitimate UE's attempt to send message 3 fails and it re-attempts the procedure. The malicious UE repeats the procedure and this leads to a denial of service to the legitimate UE.

Even with the non-contention RACH procedure, a malicious UE can deny service to the legitimate UE. For example, when the legitimate UE performs a RACH for UL synchronization to a target cell during a handover, the malicious UE can capture the RA response and use the resource indicated in the UL grant to send an RRC connection re-establishment request indicating a handover failure. This leads the legitimate UE eventually to a handover failure.

The current LTE MAC specification TS 36.321 lists the structure of the Random Access (RA) response message as illustrated in FIGS. 3-5. It shows that the RA preamble used by a UE is echoed in the MAC sub-header corresponding to the RA response Protocol Data Unit (PDU) intended for the UE. Note that an RA response message can contain multiple RA responses. That is, the RA response message can respond to multiple UEs that send RA preambles in a particular RACH occasion. Also note that the RA response message is addressed to a RA-RNTI. There is a one to one association between the RA-RNTIs and the RACH occasions in each radio frame.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

The disclosure focuses on constructing the Random Access (RA) response such that only the intended UE can correctly utilize the UL grant included in it.

Figure 1:
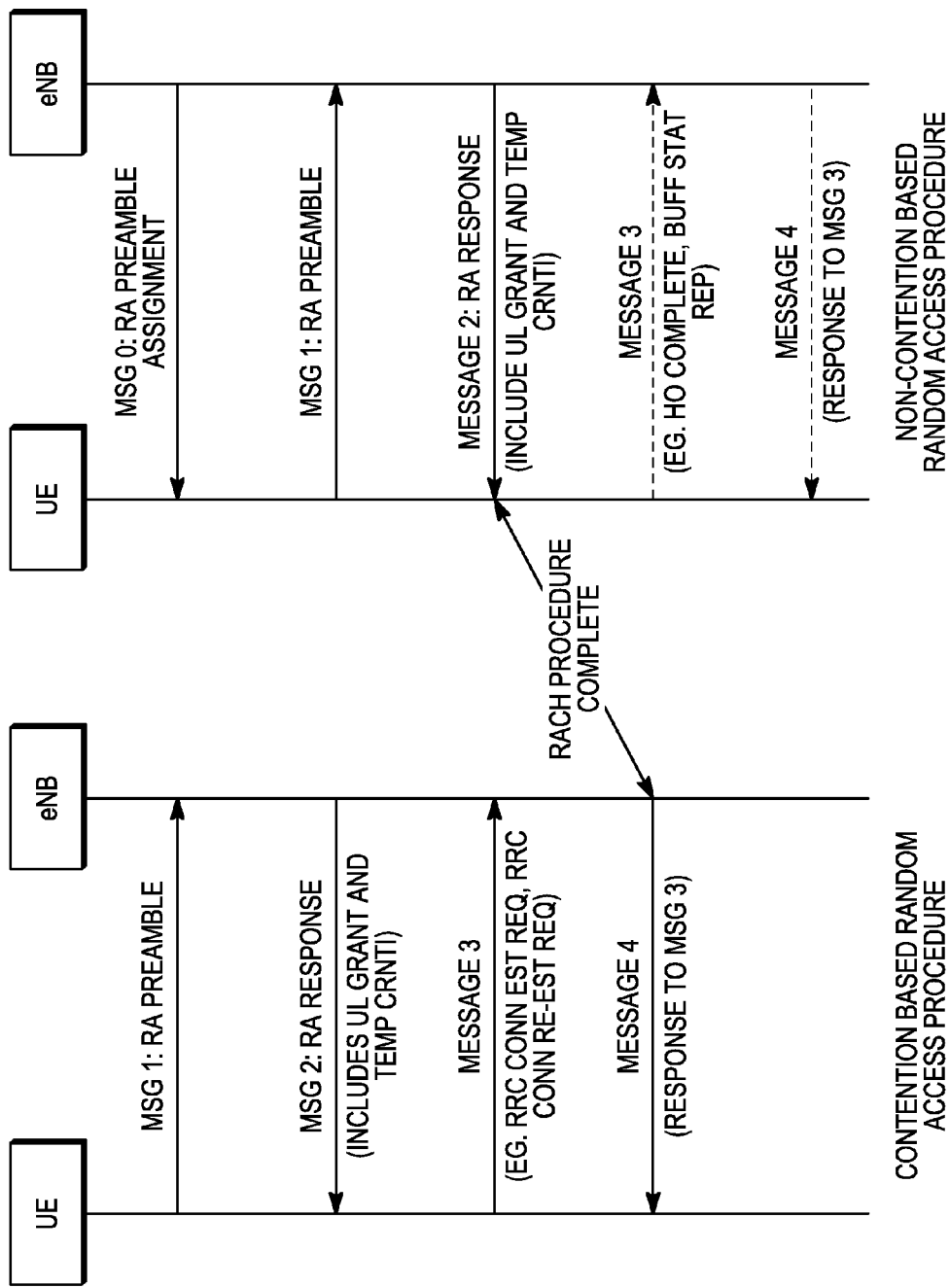
FIG. 1 illustrates a prior art random access procedure.
Figure 2:
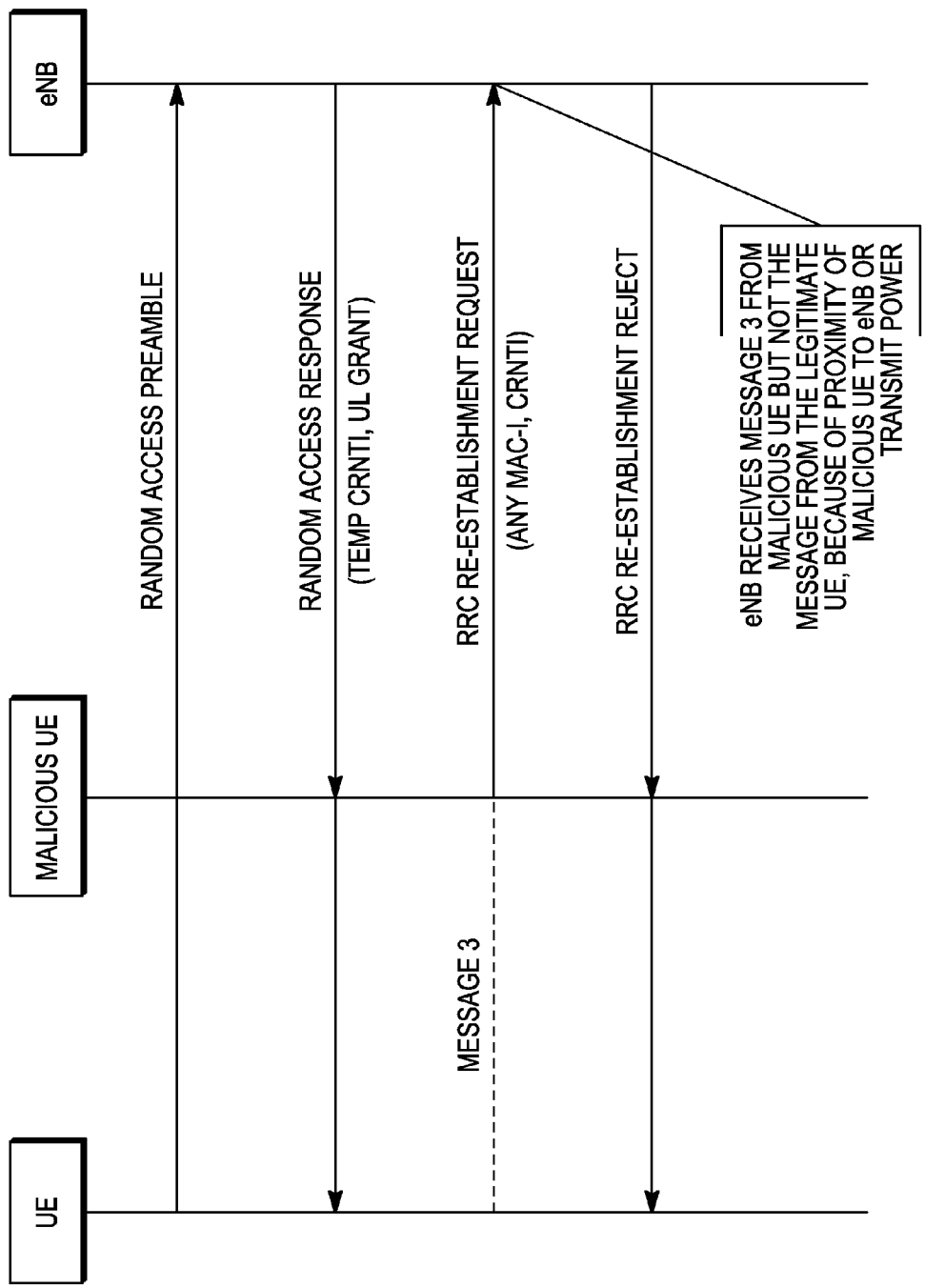
FIG. 2 illustrates a prior art procedure for exploiting a random access procedure loop hole.
Figure 3:
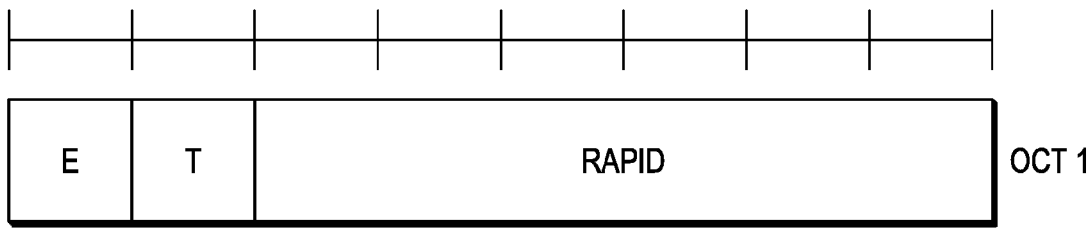
FIG. 3 illustrates an E/T/RAPID MAC sub-header.
Figure 4:
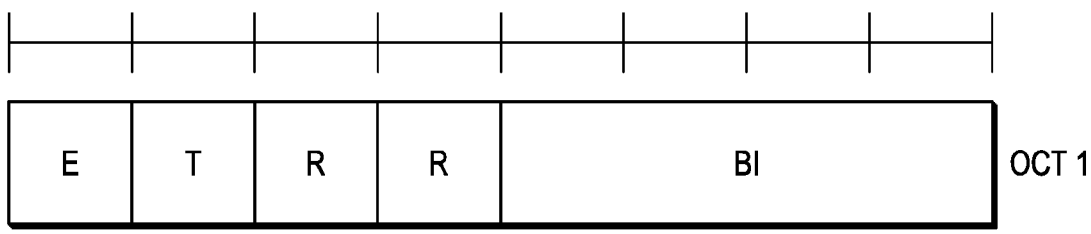
FIG. 4 illustrates an E/T/R/R/BI MAC sub-header.
Figure 5:
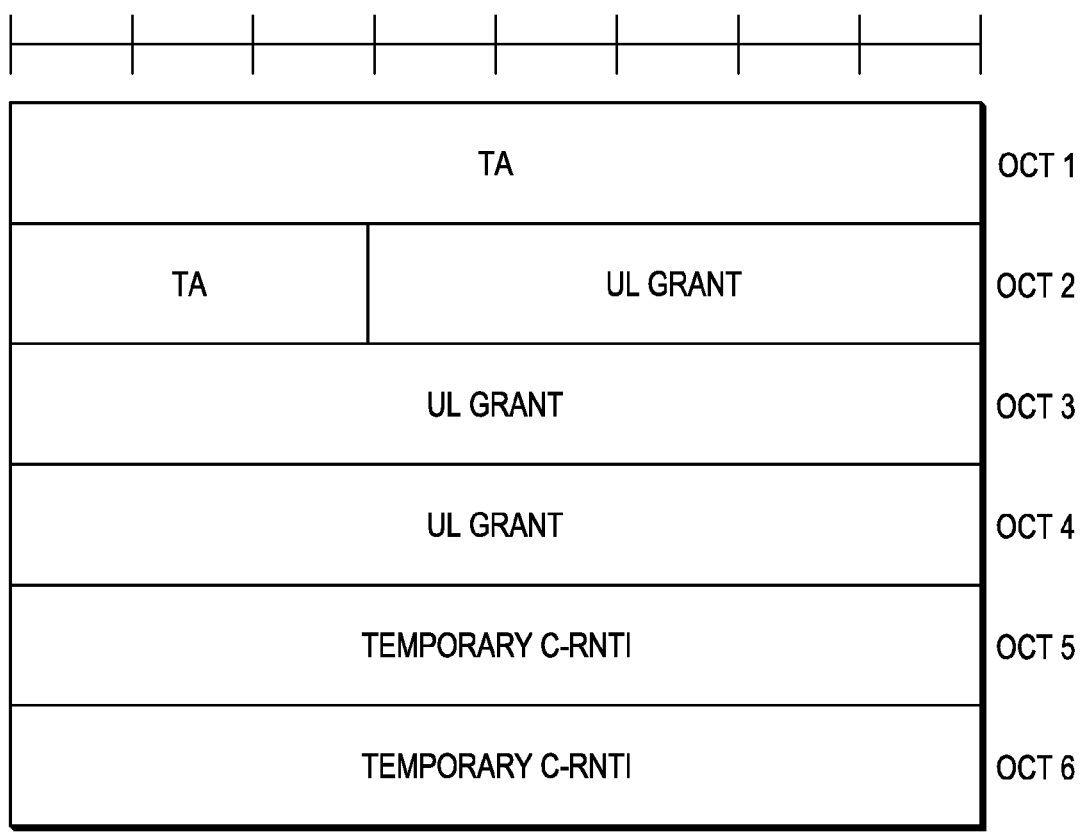
FIG. 5 illustrates an MAC RAR.

In a first embodiment of the disclosure, the UL grant is scrambled within the RA response message so that the malicious UE cannot correctly decode it. According to this embodiment, the eNB is configured to: compute a Cyclic Redundancy Check (CRC) over the Medium Access Control (MAC) Random Access Response (RAR) block (shown in FIG. 5); scramble the computed CRC using the received RA preamble; scramble the MAC RAR block using the received RA preamble; and transmit the scrambled MAC RAR block and the scrambled CRC in the RA response message.

A UE that receives the RA response message and the MAC RAR block within it is configured to de-scramble the received MAC RAR block and the corresponding received CRC using the RA preamble it transmitted to obtain RAR-descrambled and CRC-descrambled respectively; and compute the CRC of RAR-descrambled. If the CRC of RAR-descrambled is equal to CRC-descrambled, then the UE considers the RAR to be intended for itself. Otherwise, the RAR is intended for a different UE. The RA preamble used by the legitimate UE is not known to the malicious UE. A malicious UE would have to try all of the 64 RA preambles to try to successfully decode the message. The CRC can be transmitted in place of the RA preamble ID ("RAPID") in the current PDU structure.

According to another embodiment of the disclosure, the eNB addresses the RA response message to an RNTI that is offset from the (actual) RA-RNTI by the RA preamble received. Currently after transmitting a RACH preamble a UE awaits an RA response message addressed to an RA-RNTI, where RA-RNTI is $t\_id+10 \times f\_id$; where $0 \leq t\_id < 10$ and $0 \leq f\_id < 6$. The maximum value of the RA-RNTI is 59. Instead of this, the UE would await an RA response message addressed to an RNTI $t\_id+10 \times f\_id+(pr \times 64)$, where pr is the RA-preamble received by the eNB. This ensures that the 6 least significant bits of the RNTI are the RA-RNTI and the next 6 least significant bits are the preamble pr.

A UE receives the RA response message by looking for the correct RNTI and a malicious UE is unable to determine the correct RNTI to look for because it is not aware of the RA preamble transmitted by the legitimate UE. This embodiment can be implemented entirely as a change in the MAC specification. It also eliminates the need to echo the RA preamble in the RA response message, thus making the RA response message smaller. Note that currently the MAC specification allows multiple RA responses to be included in a single RA response message. For the second embodiment to be used only one RA response can be included in a RA response message and this would require a change to the 3GPP LTE MAC specification.

According to a third embodiment of the disclosure, the eNB transmits a bit string S which is the result of applying a scrambling function SCR on the RA preamble ID. The intended UE can use this for verification. The eNB assigns a resource R for message 3 transmission by signalling resource $R+f(pr)$ in the UL grant, where pr is the RA preamble transmitted by the UE, and f is a function that maps preambles to discrete numerical offsets. The offsets can be either frequency offsets or time offsets. Note that if frequency offsets are used, f depends on the cell bandwidth.

A UE that receives the RA response message de-scrambles all of the scrambled preamble identities (IDs) received and checks to see if the results include the preamble that it transmitted. If the preamble ID it transmitted is included, it determines the starting resource block for message 3 transmission from the RB R' signalled in the RA response as $R'-f(pr)$.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a mobile station to prevent misuse of a random access procedure, the method comprising:
   transmitting, by the mobile station, a random access preamble including a first preamble identifier corresponding to a Random Access Channel occasion used by the mobile station to transmit the random access preamble;
   receiving, by the mobile station, a random access response message that is addressed to a second preamble identifier that includes the first preamble identifier offset a number of bits from a third preamble identifier; and
   decoding the random access response message.

2. The method according to claim 1, wherein the second third preamble identifier is a random access radio network temporary identifier (RA-RNTI).

3. The method according to claim 1, further comprising:
   receiving a random access response message that is addressed to an identifier other than the second preamble identifier; and
   discarding the random access response message.

4. The method according to claim 1, further comprising receiving an indication of a set of random access preambles, and wherein transmitting the random access preamble includes transmitting a random access preamble from the set of random access preambles.

5. A method in a base station to prevent misuse of a random access procedure, the method comprising:
   receiving, at the base station, a random access preamble from a mobile station, the random access preamble including a first preamble identifier corresponding to a Random Access Channel occasion that was used to transmit the random access preamble;
   constructing a random access response message for the first mobile station that is addressed to a second preamble identifier that includes the first preamble identifier offset a number of bits from a third preamble identifier; and
   transmitting, from the base station, the random access response message.

6. The method according to claim 5, wherein the third preamble identifier is a random access radio network temporary identifier (RA-RNTI).

7. The method according to claim 5, further comprising transmitting an indication of a set of random access preambles, and wherein receiving the random access preamble includes receiving a random access preamble from the set of random access preambles.

8. A wireless communication device comprising:
   a transceiver coupled to a controller,
   the controller configured to cause the transceiver to transmit a random access preamble having a first preamble identifier corresponding to a Random Access Channel occasion used by the transceiver to transmit the random access preamble and configured to cause the transceiver to receive a random access response message,
   the controller including a random access response processing module,
   the random access response processing module configured to program the transceiver to decode random access response messages addressed to a second preamble identifier, wherein the second preamble identifier includes the first preamble identifier offset a number of bits from a third preamble identifier.

9. A base station comprising:
   a transceiver configured to receive a random access preamble that includes a first preamble identifier corresponding to a Random Access Channel occasion used by a mobile station to transmit the random access preamble received by the transceiver and to transmit a random access response to the mobile station;

a controller coupled to the transceiver, the controller configured to allocate resources to mobile stations for transmission of messages, the controller including a random access response message generation module, the random access response message generation module configured to generate a random access response message addressed to a second preamble identifier, wherein the second preamble identifier includes the first preamble identifier offset a number of bits from a third preamble identifier.

10. The method according to claim 1, wherein the first preamble identifier is offset from the third preamble identifier by at least one of a discrete numerical offset, a time offset, and a frequency offset.

11. The method according to claim 10, wherein the first preamble identifier is offset from the third preamble identifier by the discrete numerical offset, wherein the discrete numerical offset is equal to pr multiplied by 64, wherein pr is the random access preamble.

12. The method according to claim 5, wherein the first preamble identifier is offset from the third preamble identifier by at least one of a discrete numerical offset, a time offset, and a frequency offset.

13. The method according to claim 12, wherein the first preamble identifier is offset from the third preamble identifier by the discrete numerical offset, wherein the discrete numerical offset is equal to pr multiplied by 64, wherein pr is the random access preamble.

14. The wireless communication device according to claim 8, wherein the first preamble identifier is offset from the third preamble identifier by at least one of a discrete numerical offset, a time offset, and a frequency offset.

15. The wireless communication device according to claim 14, wherein the first preamble identifier is offset from the third preamble identifier by the discrete numerical offset, wherein the discrete numerical offset is equal to pr multiplied by 64, wherein pr is the random access preamble.

16. The wireless communication device according to claim 8, wherein the third preamble identifier is a random access radio network temporary identifier (RA-RNTI).

17. The base station according to claim 9, wherein the first preamble identifier is offset from the third preamble identifier by at least one of a discrete numerical offset, a time offset, and a frequency offset.

18. The base station according to claim 17, wherein the first preamble identifier is offset from the third preamble identifier by the discrete numerical offset, wherein the discrete numerical offset is equal to pr multiplied by 64, wherein pr is the random access preamble.

19. The base station according to claim 9, wherein the third preamble identifier is a random access radio network temporary identifier (RA-RNTI).

* * * * *